July 2, 1929.  A. J. LOEPSINGER  1,719,666
WATER METER
Filed July 5, 1923
Fig. 1.
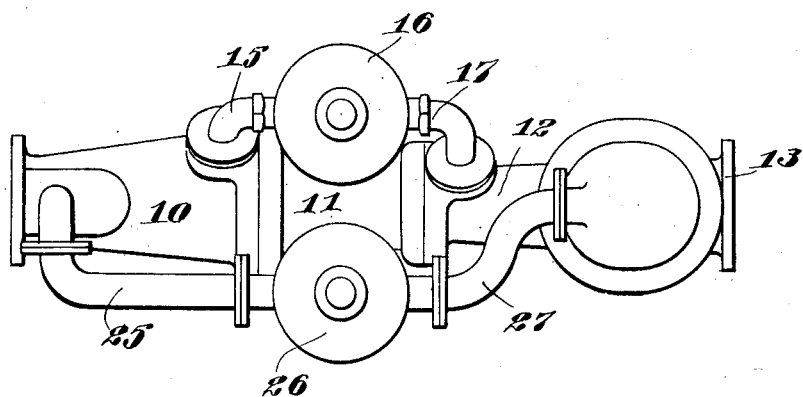
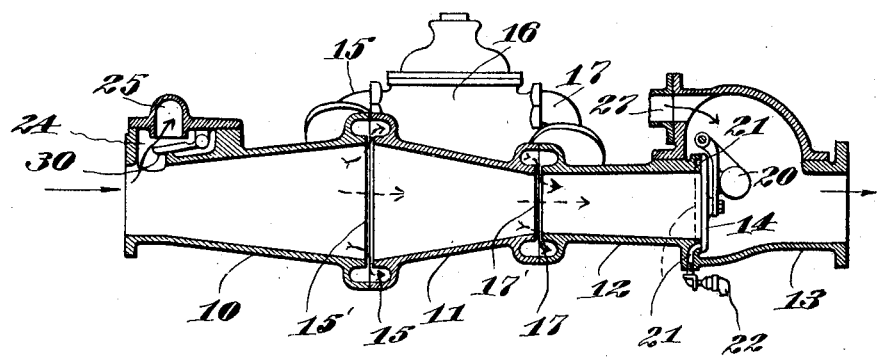
Fig. 2.
INVENTOR
Albert J. Loepsinger
BY
Mitchell, Chadwick & Kent
ATTORNEYS Patented July 2, 1929.

1,719,666

UNITED STATES PATENT OFFICE.

ALBERT J. LOEPSINGER, OF PROVIDENCE, RHODE ISLAND, ASSIGNOR, BY MESNE ASSIGNMENTS, TO GENERAL FIRE EXTINGUISHER COMPANY, OF PROVIDENCE, RHODE ISLAND, A CORPORATION OF DELAWARE.

WATER METER.

Application filed July 5, 1923. Serial No. 649,484.

This invention relates to improvements in water meters. It is especially adapted for the supply pipe leading to a sprinkler fire extinguisher system, wherein the flow of water may at any moment become large, so that the full passage must be free from obstructions; and yet wherein water may possibly be drawn more or less regularly for purposes other than fire protection. In such cases it is not feasible to have a single meter serve both purposes, and apparatus is well known in which two meters are employed, the one being set in a branch and return passage which registers a small flow that is proportional to the large flow through the main passage, and the other meter being set in a by-passage for registering total flow where the total flow is too small to open a weighted valve set in the main passage, which main passage therefore is temporarily closed. But in such cases the branch passage has had to be very large, in order to be sufficiently sensitive, making the expense of building such meters relatively great. It is an object of the present invention to provide apparatus by which the water can be accurately metered, whether flowing rapidly or slowly, on a principle of construction such that the meter as a whole is relatively inexpensive.

The invention provides for this by having a main flow passage, with a main valve; a by-passage, which takes the whole of the flow when the flow is small, and which automatically and instantly closes with a snap when the flow reaches a predetermined limit; and with a branch passage for registering large flow, which has no flow until the said closure of the by-passage, which has provision for registration in a proportional way, and which is so efficient that its capacity of flow can be very small and its meter inexpensive. This is accomplished by providing a weighted differential valve in the main passage, which remains closed so long as the by-passage for the small flow is able to supply the water which is being drawn. But when the demand for water exceeds the predetermined amount the weight and differential are overcome by the supply pressing forward in the main channel, letting large flow occur through a series of Venturi tubes which provide a marked pressure differential, greatly exceeding that produced by friction devices heretofore proposed. As a result of this a positive and reliable measurement can be made in a small branch passage with a small meter. The flow-limit valve which closes the small flow by-passage, and opens it whenever the flow is below said limit, operates independently of the large flow valve. Specifically this is illustrated as a clapper which seats upward with the flow, which is closed by the flow, and which gravity tends constantly to open. The conditions under which it will be closed therefore, are determined by the relative balance between the pull of gravity, tending to open it; and the demand for water whose flow tends directly to close it.

The accompanying drawing illustrates one embodiment of the invention, but it will be understood that the invention may be otherwise constructed and arranged, on principles herein set forth. It is intended that the patent shall cover, by suitable expression in the appended claims, whatever features of patentable novelty exist in the invention disclosed.

In the accompanying drawings:

Figure 1 is a plan of the meter as a whole; and

Figure 2 is an elevation in medial section through the same.

Referring to the drawings, the passage for large flow is a straight way through the series of tubes marked respectively 10, 11, 12 and 13, when the main passage check valve 14 is open between the sections 12 and 13. For the measurement of flow through this main passage the tube or section 10 progressively and gradually expands from the rated size of pipe or passage at its beginning; the section 11 contracts to less than rated size; and the section 12 slightly expands reaching rated size at the check valve 14. This gives a decrease of velocity at the division line between sections 10 and 11, thus providing an increase of lateral pressure; and it gives increase of velocity, thus providing a decrease of lateral pressure at the dividing line between sections 11 and 12, on principles that are well understood in connection with Venturi tubes. At the point of higher pressure there is a circular slot 15' or other suitable means for escape of water into the first section 15 of a branch passage which leads through the meter 16 and the return section 17 back into the beginning of tube 12 at the point 17' where pressure is lowest. The diameter of the main passage at 15 may easily be double that at 17, with consequent very considerable difference of pressure. This meter 16 therefore registers the flow in a branch passage stream 15, 16, 17 which is proportional to the flow through the main passage 10, 11 and 12, and which operates under relatively great head, although in meters for this purpose as heretofore constructed there has been relatively little diffeence of head, even with the aid of a friction ring. Consequently this meter may be of the inexpensive disc type, such as is used in domestic service.

The check valve 14 has a weight 20 and an annular differential chamber 21 which is open to atmosphere through a ball drip valve 22. In consequence, when pressure of water is equal or nearly equal on both sides of the valve 14, as when the demand is satisfied by moderate flow through the small flow by-passage about to be described, this valve 14 remains tightly closed. But when the pressure on the supply side exceeds that on the discharge side by substantial amount, as happens instantly when the small flow by-passage becomes closed, this valve 14 opens.

But so long as the valve 14 remains closed all flow must go through a by-passage, the normal small flow by-passage, whose entrance is at the beginning of the section 10, through a side chamber 24. This passage consists of entrance section 25, meter 26 and return section 27, which leads back into the main pipe section 13 beyond the check valve 14. The meter 26 is adapted in size, type and capacity for registering only a relatively small flow; and the passage 25, 26, 27 may be relatively small, as, for example, having a capacity of 30 or 40 gallons per minute without sufficient friction arising to open the check valve 14. In the chamber 24 at the entrance of this passage is a flow-limit clapper 30 whose function it is to shut off the inflow to this by-passage when the predetermined maximum limit of flow through this passage is reached. This valve, in the particular case illustrated, is a pivoted clapper, arranged in chamber 24 under the entrance to by-passage 25; and it is made of such weight and leverage, and of such size in relation to the surrounding chamber walls that it is lifted by the rush of water when the predetermined flow has been attained; so that this by-passage then becomes closed. The precise dimensions of this must depend upon circumstances, but they are easily ascertainable by experiment in any given instance.

Upon the seating of the clapper 30, flow into the by-passage immediately stops. The continued discharge of water, which up to the moment of closing the clapper 30 has been supplied through the by-passage, promptly reduces the pressure beyond the differential valve, allowing the latter to open for flow through the main and branch passages. Thereafter as long as this flow continues the valve 30 will remain closed because of the difference in pressures on its two sides, that on its side next to the main passage being the lateral pressure of the water in the main stream at that point, while the pressure on its inner or seated side is somewhat less due to the aspirator effect on the water in the by-passage caused by the rush of water in the main passage past the open end of the by-passage. But however often this valve may open and close, and however the distribution of flow may be divided, all water that goes through each passage is duly measured and recorded.

Although the apparatus illustrated is especially adapted to use in supply systems for sprinkler fire extinguisher systems and to other systems where the flow may vary between very small and very large, it can obviously be applied to other uses; and for some purposes the branch and return passage may be used without the other. The notable difference of pressure obtainable between the two ends of this passage makes it capable of registering accurately smaller flows through the main passage than can be handled in the branch passages which have previously been known. This enables it to be designed to supplant in part the functions previously assigned to the by-passage; and in some cases where the variations of flow to be measured are not too great it may be found practical thus to supplant the by-passage entirely. In designing this branch passage it is preferred to have the enlargement of the main passage precede the contraction thereof, in which case the flow through the branch passage is in the same direction as the flow through the main passage and maximum capacity of flow per unit of diameter is attained. If it be preferred that the pipe diameter shall not be at any place reduced to below the rated pipe size, the apparatus will operate between the higher pressure provided by an enlargement of the pipe and the normal pressure at the normal diameter of the pipe. And it obviously is not necessary to place the inlet and outlet of the branch passage respectively at the points of maximum and minimum diameter, although such locations are to be preferred as providing greater pressure differences and thus making possible successful and sensitive operation with a smaller branch passage and smaller meter therein. This feature of the apparatus may be applied, in general, to any situation where it is desired to measure the flow without introducing any obstruction, and even, if desired, without introducing any contraction, in the main flow passage; and it is applicable to any fluid, liquid or gaseous. When thus applied without the by-passage it affords an inexpensive and accurate direct reading meter which may be employed as an improved substitute for the rather complicated devices heretofore employed only with the aid of charts, records and mathematical computation therefrom. The meter in the branch passage may be of any suitable type and while it has been herein referred to as a quantity meter, such being the most usual need, it obviously might be of some other type, such as one showing the rate at any particular instant.

I claim as my invention:

1. Means for measuring flow of water in a pipe, comprising the combination with a main straightaway passage for large flow, a branch passage leading from and returning to said main passage having a meter associated therewith, and means tending to close said main passage, of a by-passage for small flow, leading around said main passage closing means, and having a meter associated therewith; and means, independent of said main passage closing means, for automatically closing said by-passage upon increase of flow therethrough to a predetermined degree.

2. Means for measuring flow of water in a pipe, comprising the combination of a main straightaway passage, a branch leading from and returning to said main passage, means to measure large flow associated with the branch passage, and a differential valve tending to close said main passage and adapted to prevent flow therethrough and through the branch passage, and to be swung out of the water-way when flow therethrough occurs; a by-passage having connections with said main passage on opposite sides of said valve, adapted to permit small flow through said pipe, and a meter sensitive to small flow associated with the by-passage; and at the entrance to said by-passage a valve, normally open, but adapted to close said by-passage upon increase of flow therein to a predetermined degree.

3. Means for measuring flow of fluid comprising a tapering main passage; a valve tending to close it and adapted to open when the pressure upon the valve reaches sufficient magnitude; a branch and return passage making connection between the larger and smaller cross-sections of the said main passage on the same side of the valve and having a meter; combined with a by-passage around said valve, with meter for registering flow in said by-passage; and means controlling the entrance to said by-passage adapted upon increase of flow therethrough to close said by-passage.

4. Means for measuring flow in a pipe comprising the combination with a Venturi meter for measuring large flow in the pipe of a by-passage around said Venturi meter for small flow having a meter associated therewith for measuring the small flow therethrough; there being a valve at the entrance of said by-passage adapted to close it under increase of flow therethrough to a predetermined amount; and means preventing flow through the Venturi meter while said by-passage is open, adapted to permit such flow when said by-passage valve is closed.

5. Means for measuring flow in a pipe comprising a main passage having a portion whose cross section gradually increases in the direction of flow to a maximum, then gradually decreases in the same direction to a minimum; a branch and return passage connected with the said main passage through circumferential openings at the points of maximum and minimum cross-section; and a meter associated with said branch and return passage adapted to measure the flow therethrough.

6. A meter for measuring flow in a pipe comprising a portion of the pipe whose cross section gradually increases to a maximum, and afterward gradually diminishes to below the normal size of the pipe and afterward gradually returns to normal, combined with a conduit constituting a branch and return passage having connections with said pipe at its points of maximum and of minimum cross section; and a meter in said passage adapted to measure flow therethrough.

Signed at Providence, Rhode Island, this 19th day of May, 1923.

ALBERT J. LOEPSINGER.